INVENTORS
John P. Beltz &
Harold B. Currie
BY John V. Regan
ATTORNEY

United States Patent Office 3,493,771
Patented Feb. 3, 1970

3,493,771
LENGTH MONITORING SYSTEM
John P. Beltz, Willingboro, and Harold B. Currie, Gibbsboro, N.J., assignors to RCA Corporation, a corporation of Delaware
Filed July 25, 1967, Ser. No. 655,958
Int. Cl. G01n 21/30; H01j 39/12; G06m 7/00
U.S. Cl. 250—219                                    7 Claims

ABSTRACT OF THE DISCLOSURE

A length monitoring system for detecting the passage of a document of abnormal length in a document transport apparatus by comparing the actual passage time with a reference time to produce an output signal if the actual time is greater than the reference time.

BACKGROUND OF THE INVENTION

The feeding, or transporting, of a multiple number of documents, such as checks, in an end-to-end spaced relationship gives rise to a so-called "double feed" problem wherein two documents may be momentarily attached by electrostatic and other forces and fed by the transport as a single document. While the documents in a single batch are of uniform length, they may be either of miscellaneous thickness or of such thickness that they cannot be readily separated by mechanical means without incurring damage to the document. Thus, the document transport system must be capable of handling documents of several thicknesses, and a double feed of two documents having a total thickness within the fixed mechanical limits of the document transport apparatus can readily occur. Such a double feed will give rise to an erroneous reading of the documents at a reading station and may cause a jam of the transport apparatus. It has been found that in a double feed condition, the documents are overlapped with the extraneous, or top document being slightly displaced with respect to the bottom, or proper, document. This combination, accordingly gives rise to an artificial document having an augmented length and thickness. Mechanical monitoring devices known to the art have attempted to utilize the augmented thickness to actuate a mechanical lever or switch to detect the double feed. Since the documents in actual use may have a thickness of the order of .0035 of an inch, it is apparent that the mechanical devices are inadequate to detect a double feed of such documents. Prior art electronic monitoring devices have involved complex electronic circuitry and have usually not been adaptable for use with opaque documents.

BRIEF SUMMARY OF THE INVENTION

The present invention is arranged to provide a monitoring system for a document transport apparatus with document sensing means positioned along the path of document travel to detect the passage of the leading and trailing edges of the document. A trigger circuit is arranged to measure the passage time and to produce an output signal for application to an alarm means when the passage time is indicative of a document of an augmented length. The operation of the trigger circuit is correlated with the length of the documents being transported by connecting a trailing edge document guide in a document input magazine with an external circuit adjusting means for the trigger circuit.

DETAILED DESCRIPTION OF THE INVENTION

Figure 1:
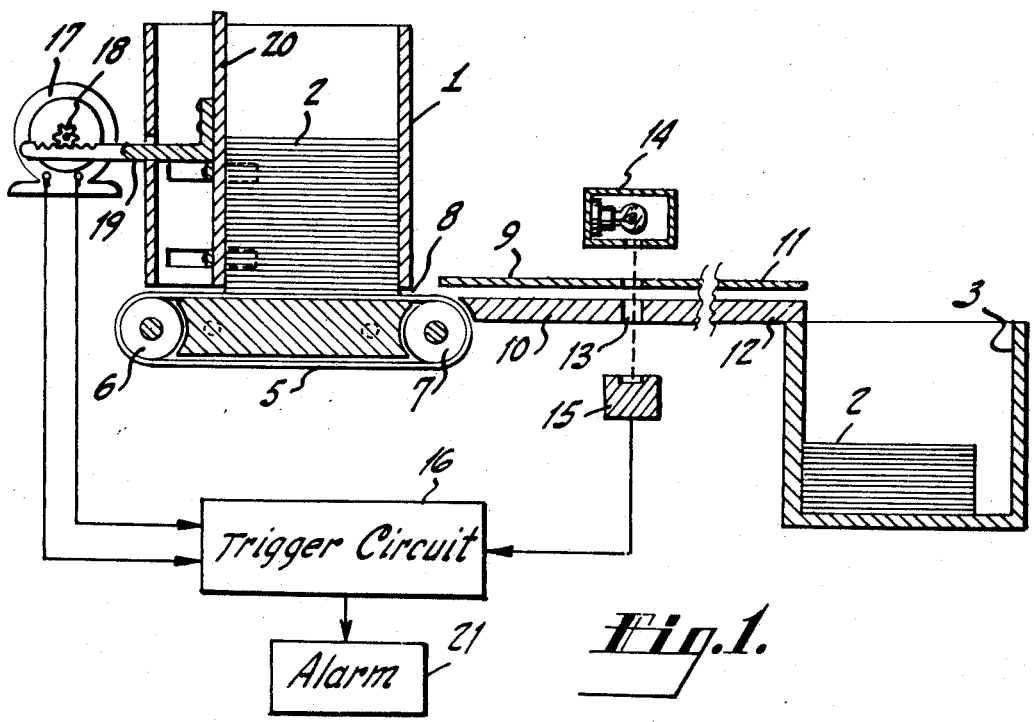
FIGURE 1 shows a pictorial view of a monitoring system embodying the present invention.

In FIGURE 1, there is shown a monitoring apparatus embodying the present invention. A magazine 1 is arranged to hold a stack of similar length documents 2 to be transported from the magazine 1 and to a receiving hopper 3. The documents 2 may be transported to the hopper 3 by any suitable transport system, the details of which do not form a part of this invention. For example, a friction drive belt 5 driven by wheels 6, 7 may be arranged in contact with the bottom surface of the lowest one of the documents 1. The motion of the belt 5 is effective to extract the contacting one of the documents 2 and to propel this document from the magazine 1 through a throat, or slot, 8. The moving documents 2 are then guided between guide plates shown in representative form as plates 9, 10, 11, 12 to the hopper 3. The further details of the transport system which may include additional drive means, guide means and document reading means have been omitted in order to simplify the illustration of the present invention.

At a location outside of the magazine 1 and before the moving document encounters a document reading means, there is provided a document passage time sensing station. In the illustrated embodiment, there is provided a slot 13 in both of the guide plates 9, 10. The slot 13 is further arranged to be at a location wherein the moving documents will pass at a steady and predetermined speed. The slot 13 is arranged to form a light conducting channel between a light source 14 positioned above the guide plates and a photocell 15 positioned below the guide plates.

The photocell 15 is electrically connected to a delay trigger circuit 16 to provide an input signal thereto. The output signal of the trigger circuit 16 may be delayed by a variable amount which delay is controlled by an external, variable resistor 17 electrically connected to the trigger circuit 16. An operative shaft for the variable resistor 17 has a pinion 18 which is geared to a rack 19. The rack 19 is mechanically connected to an adjustable trailing edge guide 20 in the magazine 1. An output signal from the trigger circuit 16 is applied to an alarm means 21.

In operation, the present invention is arranged to detect the "length" of a moving document and to compare the detected length with a preset reference "length." When the detected length is greater than the reference length, the alarm means 21 is activated to signal the presence of an improperly fed document, i.e., a double feed. This operation is achieved by detecting the leading and trailing edges of a moving document. The detection operation is effected by an interruption of the light beam from the light source 14 which normally is directed to the photocell 15. When the leading edge of the moving document interrupts the light beam, the resulting change in the state of the photocell 15 is arranged to produce an input signal for activating the trigger circuit 16. This circuit is arranged to produce an output signal after a predetermined delay period if the input signal thereto is maintained during that period. A suitable circuit for use as the trigger circuit 16 is shown in FIGURE 2 and described more fully hereinafter.

The delay period of the trigger circuit 16 is controlled by the external variable resistor 17. The resistance of the resistor 17 is directly controlled by the position of the trailing edge guide 20 in the magazine 1. Thus, when the edge guide 20 is positioned against the aligned edges of the documents 2 in the magazine 1, the resistance of the resistor 17 is arranged to produce the appropriate delay characteristic for the trigger circuit 16.

When the trailing edge of the moving document passes the slot 13 and unblocks the light from the light source 14, the enabling signal from the photocell 15 is terminated. If this condition occurs at a time representative of the end of the passage of a document having a proper document length, the trigger 16 is effectively inactivated and an output signal for the alarm circuit 21 is not produced. On the other hand, if the unblocking of the light source 14 occurs after the time required for the passage of a document having a proper length, the trigger circuit 16 will have produced its output signal to activate the alarm circuit 21 as an indication of the passage of an extra length document, i.e., a double feed. Thus, the present invention is automatically set to detect a double feed when the edge guide 20 is adjusted against the trailing edge of the stack of documents in the magazine 1. It is to be noted that the present invention is also effective to detect an error in the document speed which may produce an error at a document reading means.

Figure 2:
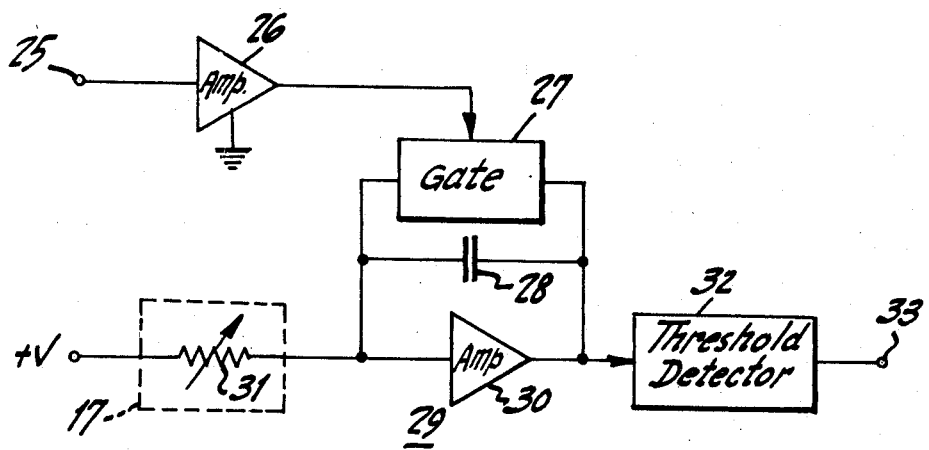
FIGURE 2 is a block diagram of a trigger circuit suitable for use with the system shown in FIGURE 1.

In FIGURE 2 there is shown a block diagram of a trigger circuit suitable for use as the trigger circuit 16 in FIGURE 1. The input signal from the photocell 15 is applied to an input terminal 25. This input signal is amplified by an amplifier 26 and applied to a gate circuit 27. The gate circuit 27 is connected across a capacitor 28 of a conventional analog integrator circuit 29 comprising the capacitor 28, an operational amplifier 30 and an input resistor 31. The integrator circuit 29 is arranged to integrate a signal from a source +V. The output signal from the integrator circuit 29 is applied to a threshold detector 32 and compared to a preset threshold, or reference, signal. When this output signal exceeds the reference signal, the threshold detector 32 is arranged to produce an output signal on an output terminal 33. The input resistor 31 of the integrator circuit 29 is the variable resistor 17 shown in FIGURE 1. Thus, a variation in the resistance of resistor 31 in the aforesaid operation of the trailing edge guide 20 of FIGURE 1 is effective to vary the integrating time of the integrating circuit 29 required to reach the threshold level of the detector 32, i.e., a longer integrating time for a long document as compared with a short document. The gate circuit 27 is used to rapidly discharge the capacitor 28 when the signal from the photocell 15 is representative of a space between the moving documents.

In operation, the signal from the photocell 15 representative of the leading edge of a document interrupting the light beam is effective to open the gate 27 to allow the integrator circuit 29 to charge toward the threshold level of the detector 32. Conversely, the document trailing edge signal from the photocell 15 is arranged to close the gate 27 to rapidly discharge the capacitor 28. This discharged state is maintained by the gate 27 until the next leading edge signal from the photocell 15. If the trailing edge signal is applied to the gate 27 before the integrator output signal has exceeded the threshold level of detector 32, the detector 32 does not produce an output signal on output terminal 33. This operation corresponds to the passage of a document of proper length. On the other hand, if the trailing edge signal is delayed as in the case of the passage of a document of augmented length, then the integrator circuit 29 output signal exceeds the threshold level of the detector 32, and an output signal from the detector 32 is applied to the output terminal 33 and, subsequently, to the alarm circuit 21.

Accordingly, it may be seen that there has been presented, in accordance with the present invention, a monitoring system operative to detect and to signal the passage of a moving document having a proper length.

What is claimed is:

1. In a document feeding device for successively feeding documents in an end-to-end relationship, a monitoring system comprising sensing means arranged to sense the passage time of a document past a predetermined location along a document feed path and to produce an output signal representative of said time and means for comparing the actual passage time represented by said output signal from said sensing means with a reference signal indicative of the passage time of a proper document length and including means for coupling said means for comparing to said feeding device whereby said reference signal for said means for comparing is predetermined by a mechanical adjustment of said feeding device for a particular length document.

2. In a document feeding device for successively feeding documents in an end-to-end spaced relationship a monitoring system comprising sensing means arranged to sense the passage time of a document past a predetermined location along a document feed path and to produce an output signal representative of said time and means for comparing the actual passage time represented by said output signal from said sensing means with a reference signal indicative of the passage time of a proper document length wherein said means for comparing includes means for generating said reference signal, said reference signal having a rise time predetermined by the length of the documents in said feeding device and a preset final amplitude.

3. A monitoring system as set forth in claim 2 wherein said means for generating includes a signal integrating circuit having an input resistor, an operational amplifier having an input circuit connected to one end of said resistor, a feedback capacitor for said amplifier and a signal source connected to the other end of said resistor.

4. A monitoring system as set forth in claim 3 and including a threshold detector connected to an output circuit of said amplifier to detect the presence of an amplitude of said reference signal greater than the threshold level of said detector.

5. A monitoring system as set forth in claim 4 and including a signal gating means connected in parallel with said capacitor and responsive to said output signal from said sensing means to discharge said capacitor at the end of said output signal and to permit a charging of said capacitor at the beginning of said output signal.

6. A monitoring system as set forth in claim 5 wherein said input resistor is a variable resistor and including means for coupling said resistor to said feeding device to be adjusted concurrently with an adjustment of said feeding device for a particular length document.

7. A monitoring system as set forth in claim 6 wherein said sensing means includes a photocell and a light source arranged to produce a first output signal indicative of the passage of the leading edge of a document past said location, said first output signal being applied to said signal gating means to permit a charging of said capacitor and a second output signal indicative of the passage of the trailing edge of said document past said location, said second output signal being applied to said signal gating means to discharge said capacitor.

References Cited

UNITED STATES PATENTS

| | | | |
|---|---|---|---|
| 2,809,297 | 10/1957 | Hartwig et al. | 250—223 X |
| 3,026,419 | 3/1962 | Aweida et al. | 250—223 X |
| 3,046,538 | 7/1962 | Pedersen | 250—223 X |
| 3,159,749 | 12/1964 | Dalrymple et al. | 250—223 |
| 3,320,430 | 6/1967 | Gorman | 235—61.115 X |
| 3,349,905 | 10/1967 | Crawford | 250—223 X |

ARCHIE R. BORCHELT, Primary Examiner

C. M. LEEDOM, Assistant Examiner

U.S. Cl. X.R.

235—61.115; 250—223